United States Patent
Guo et al.

(10) Patent No.: US 11,728,489 B2
(45) Date of Patent: Aug. 15, 2023

(54) THREE-DIMENSIONAL CURRENT COLLECTOR FOR METAL SECONDARY BATTERY ANODE, ITS PREPARATION AND APPLICATION

(71) Applicant: INSTITUTE OF CHEMISTRY, CHINESE ACADEMY OF SCIENCES, Beijing (CN)

(72) Inventors: Yuguo Guo, Beijing (CN); Lin Liu, Beijing (CN); Yaxia Yin, Beijing (CN); Lijun Wan, Beijing (CN)

(73) Assignee: INSTITUTE OF CHEMISTRY, CHINESE ACADEMY OF SCIENCES, Beijing (CN)

( * ) Notice: Subject to any disclaimer, the term of this patent is extended or adjusted under 35 U.S.C. 154(b) by 292 days.

(21) Appl. No.: 16/605,797

(22) PCT Filed: Mar. 26, 2018

(86) PCT No.: PCT/CN2018/080500
§ 371 (c)(1),
(2) Date: Oct. 16, 2019

(87) PCT Pub. No.: WO2018/192341
PCT Pub. Date: Oct. 25, 2018

(65) Prior Publication Data
US 2020/0127294 A1    Apr. 23, 2020

(30) Foreign Application Priority Data
Apr. 17, 2017    (CN) .......................... 201710250367.2

(51) Int. Cl.
*H01M 4/66* (2006.01)
*H01M 4/76* (2006.01)
(Continued)

(52) U.S. Cl.
CPC ........... *H01M 4/663* (2013.01); *H01M 4/762* (2013.01); *H01M 10/054* (2013.01); *H01M 10/0525* (2013.01)

(58) Field of Classification Search
CPC .................................................... H01M 4/663
See application file for complete search history.

(56) References Cited

U.S. PATENT DOCUMENTS

2010/0170784 A1    7/2010    Yang et al.

FOREIGN PATENT DOCUMENTS

CN    102162154    *    8/2011
CN    102162154 A    *    8/2011
(Continued)

*Primary Examiner* — Ula C Ruddock
*Assistant Examiner* — Thomas H. Parsons
(74) *Attorney, Agent, or Firm* — NKL Law; Allen Xue (57) ABSTRACT

The present invention provides a three-dimensional current collector used in a metal secondary battery and the preparation method of said current collector. Said current collector is a three-dimensional porous hollow carbon fiber current collector which has both porous structure and hollow structure and is used to load metal anode, so that lithium dendrites growth can be suppressed and the Coulombic efficiency can be improved. Said current collector is intertwined by micrometer-sized hollow carbon fibers with the diameter of 1 to 50 μm, the wall thick of 0.5 to 6 μm, and the pore volume of 0.005 to 0.05 $cm^3\ cm^{-2}$.

2 Claims, 5 Drawing Sheets

(51) Int. Cl.
*H01M 10/0525* (2010.01)
*H01M 10/054* (2010.01)

(56) References Cited

FOREIGN PATENT DOCUMENTS

| | | | | |
|---|---|---|---|---|
| CN | 102162154 | A | | 8/2011 |
| CN | 102306800 | A | | 1/2012 |
| CN | 104716330 | | * | 6/2015 |
| CN | 104716330 | A | | 6/2015 |
| CN | 105789559 | | * | 7/2016 |
| CN | 105789559 | A | * | 7/2016 |
| CN | 106898778 | A | | 6/2017 |
| JP | 2006244949 | | * | 9/2006 |
| JP | 2006244949 | A | * | 9/2006 |
| KR | 20130078646 | | * | 7/2013 |
| KR | 20130078646 | A | * | 7/2013 ............ H01M 4/581 |

* cited by examiner

THREE-DIMENSIONAL CURRENT COLLECTOR FOR METAL SECONDARY BATTERY ANODE, ITS PREPARATION AND APPLICATION

TECHNICAL FIELD

The present invention belongs to the field of electrochemistry, and specifically relates to a three-dimensional current collector for the anode used in a metal secondary battery, a preparation method thereof, and a secondary battery anode with a dendrite suppression effect obtained by using the current collector. The metal anode using this current collector can be used in a high-energy-density energy storage device, significantly improving its safety, Coulombic efficiency and cycle life.

BACKGROUND ART

In order to meet the ever-increasing demand for portable electronics, electric cars and smart grid, high-energy-density battery systems that go beyond traditional lithium-ion batteries are in urgent need of development. Metal secondary batteries directly use metals such as lithium, sodium, and potassium as anodes, which have attracted wide attention due to their high energy density. Taking lithium metal secondary battery as an example, lithium has a very high theoretical specific capacity (3860 mA h $g^{-1}$), a lowest potential (−3.04 V vs. SHE), and a small density (0.53 g $cm^{-3}$), which would also be used as Li anode for Li—S, Li-air rechargeable batteries. The battery system using metal lithium as an anode has a higher energy density, much higher than that of a conventional lithium ion battery, and is expected to be the next-generation energy storage device.

The metal anode still has many problems at present. Taking the lithium secondary battery as an example, lithium undergoes uneven plating/stripping during charging and discharging, producing lithium dendrite, resulting in internal short circuit and even catastrophic accidents. As lithium metal is very active, it reacts with most organic electrolyte solvents or lithium salts to form SEI. During the lithium plating/stripping process, the continuous destruction/reconstruction of the SEI not only consumes a large amount of electrolyte, but also causes severe corrosion to the lithium metal, resulting in low Coulombic efficiency and poor cycle life.

In order to solve the problems of the metal anode, the following measures have mainly been adopted at present. First, the electrolyte composition is adjusted, for example, the electrolyte concentration is changed or additives are added so as to achieve the purpose of stabilizing the SEI. Despite certain effects, most of the additives are continuously consumed during the cycling of the battery, and the resulting SEI is relatively brittle and cannot withstand the volume changes during the cycle. The second is the use of solid electrolytes to inhibit the growth of metal dendrites, but solid electrolytes have low room temperature conductivity and large interfacial impedance and poor kinetic behavior. The third is to use a physical protective layer to inhibit the growth of metal dendrite, but there is the problem of unstable interface contact.

In view of the problems of metal dendrites and low Coulombic efficiency, the present invention inventively proposes a self-supporting three-dimensional porous hollow carbon fiber structure. Metal can deposite not only within the interspace between carbon fibers, but also inside the hollow structure of the carbon fiber, resulting in dendrite-free metal deposition behavior, high plating/stripping Coulombic efficiency, large areal capacity, reducing the voltage hysteresis, and long running lifespan.

SUMMARY OF THE INVENTION

The present invention provides a three-dimensional porous current collector for the anode used in a metal secondary battery, which is a self-supporting flexible three-dimensional porous hollow carbon fiber current collector. Compared to the conventionally used planar current collectors (such as copper foil or metal anode itself as a current collector), said three-dimensional porous hollow carbon fiber current collector can suppress the dendrite during the metal plating/stripping process, greatly improving the safety of metal anode, increasing the Coulombic efficiency and cycle life, and reducing the voltage hysteresis. Moreover, said three-dimensional porous hollow carbon fiber current collector can accommodate large-surface-capacity metal. The method for preparing said three-dimensional porous hollow carbon fiber current collector is simple and easy, and the raw materials are cheap and conveniently obtained. It is suitable for large-scale production, and has high practicality.

The present invention provides a current collector used in metal secondary battery. The metal secondary battery refers to a secondary battery directly using one or more of metal lithium, sodium, and potassium as an anode. Said current collector is a three-dimensional porous hollow carbon fiber current collector, which has both porous structure and hollow structure. Said current collector is used to load metal anode, which can suppress metal dendrites growth, improve the Coulombic efficiency, increase the metal deposition areal capacity, reduce the voltage hysteresis, and lengthen cycle life.

Preferably, said three-dimensional porous hollow carbon fiber current collector consists of intertwining carbon fibers with a diameter of 1 to 50 μm, preferably 3 to 20 μm, and more preferably 5 to 15 μm. The carbon fibers have a hollow structure with the wall thickness of 0.5 to 6 μm, preferably 1 to 3 μm; and areal pore volume of 0.005 to 0.05 $cm^3\ cm^{-2}$, preferably 0.01 to 0.03 $cm^3\ cm^{-2}$, most preferably 0.02 $cm^3\ cm^{-12}$.

The invention also provides a method for preparing said current collector, comprising the following steps: Firstly, the raw materials were repeatedly washed with ethanol and deionized water 3 times, dried, rolled, and sliced. Then, the raw materials of biomass were calcined in the protective atmosphere at 700 to 1400° C., with the heating rate of 1 to 10° C./min, for 30 minutes to 5 hours. After carbonization, stop heating, maintain the inlet of the protective gas, cool the reaction furnace to room temperature, and take out the sample. Then the obtained sample was soaked with a series of different concentration of activating reagents for several hours, dried, and calcined in the protective atmosphere at 400 to 900° C., with the heating rate of 1 to 10° C./min, for 20 min to 6 h. After the activation process, the activated sample is taken out, washed with diluted hydrochloric acid or dilute sulfuric acid, washed repeatedly with deionized water and ethanol several times, and dried to obtain the desired three-dimensional hollow carbon fiber.

The raw materials are cotton, cotton cloth, medical absorbent cotton, degreasing cloth, polyacrylonitrile, polyvinyl alcohol fiber, lignin, polystyrene, and preferably cotton.

The protective atmosphere is inert gas such as argon, helium or nitrogen, or a mixed gas thereof.

The carbonization temperature is 700 to 1400° C., preferably 800 to 1300° C., more preferably 1000 to 1200° C.

The heating rate of carbonization is 1 to 10° C./min, preferably 2 to 5° C./min. The carbonization calcination time is 30 min to 5 h, preferably 1 h to 4 h, more preferably 2 h to 3 h.

The activating reagent is KOH, NaOH, $Na_2CO_3$, etc., preferably KOH.

The concentration of the activating agent is 0.005 to 10 M, preferably 0.1 to 8 M, more preferably 0.5 to 5 M.

The soaking time of the activating reagent is 0.5 to 12 h, preferably 1 to 6 h.

The calcination temperature of activation process is 400 to 900° C., preferably 600 to 800° C., more preferably 800° C.

The heating rate of activation process is 1° C. to 10° C./min, preferably 2° C. to 5° C./min. The calcination time of activation process is 20 min to 6 h, preferably 30 min to 4 h, more preferably 1 h to 3 h.

The present invention further provides a high safety metal secondary battery anode using the three-dimensional porous current collector. The anode used is one or more of metal lithium, sodium, and potassium accommodated in the above-mentioned three-dimensional porous current collector.

The present invention further provides a metal secondary battery using said anode. Said battery is a lithium battery or a sodium battery, preferably a lithium battery.

In addition, the metal secondary battery using said anode and its application in the preparation of high-safety, long-life, and high-energy-density energy storage devices also belong to the protection scope of the present invention.

The present invention further provides the use of the current collector for inhibiting lithium dendrites and increasing Coulombic efficiency in a lithium metal secondary battery by accommodating metallic lithium along three-dimensional hollow carbon fiber substrate. Compared to the common current collectors (planar copper or lithium metal), said three-dimensional hollow carbon fiber collector has a larger electroactive surface area, thereby reducing the current density and inhibiting the growth of lithium dendrites. At the same time, the hollow structure can accommodate a part of lithium, and the wall of the hollow fiber acts as a solid barrier to inhibit the growth of the lithium dendrites and relieve the volume change during the cycle.

The present invention has the following beneficial effects. Said three-dimensional hollow carbon fiber current collector has a specific pore volume, pore size, and wall thickness, which can accommodate large areal capacity (>18 mA h $cm^{-2}$) of lithium metal. Said three-dimensional hollow carbon fiber current collector can relieve the volume change during lithium plating/stripping so that the volume change of the whole electrode during the cycle is small, thereby strengthening the cycle stability and improving the cycle life. The hollow structure can accommodate a part of lithium, and the wall of hollow fiber serves as a firm barrier to inhibit the growth of lithium dendrites and relieve volume change during cycle. Said three-dimensional hollow carbon fiber current collector has a larger electroactive surface area, thereby reducing the current density and inhibiting the formation of lithium dendrites and improving the Coulombic efficiency. Compared to the common current collectors (planar copper or metallic lithium), said three-dimensional hollow carbon fiber current collector has a smaller density and a lighter weight, which is beneficial to increase the energy density of the entire battery. Said three-dimensional hollow carbon fiber current collector has good flexibility and feasible preparation process, which is beneficial to the real battery preparation process.

EMBODIMENT

The following further describes the present invention in combination with specific embodiments, and the present invention is not limited to the following implementation cases.

The experimental methods described in the following examples are all conventional methods unless otherwise specified; the reagents and materials can be obtained from commercial sources unless otherwise specified.

Embodiment 1

(1) Preparation of Three-Dimensional Porous Hollow Carbon Fibers

The biomass raw material cotton was repeatedly washed with ethanol and deionized water 3 times, dried, rolled, sliced, and calcined in the $N_2$ atmosphere in a tube furnace at 1200° C., with the heating rate of 2° C./min for 3 hours. The raw materials are carbonized into hollow carbon fibers. After carbonization, stop heating, maintain the inlet of the protective gas, cool the reaction furnace to room temperature, and take out the sample. Then, the obtained sample was soaked with 1M activating reagent KOH for 5 hours, dried, and calcined in a protective atmosphere of nitrogen at 800° C. and 5° C./min heating rate for 2 hours. After activation, the activated sample was taken out, washed with diluted hydrochloric acid, washed repeatedly with deionized water and ethanol several times, and dried to obtain the desired three-dimensional hollow carbon fibers.

Figure 1:
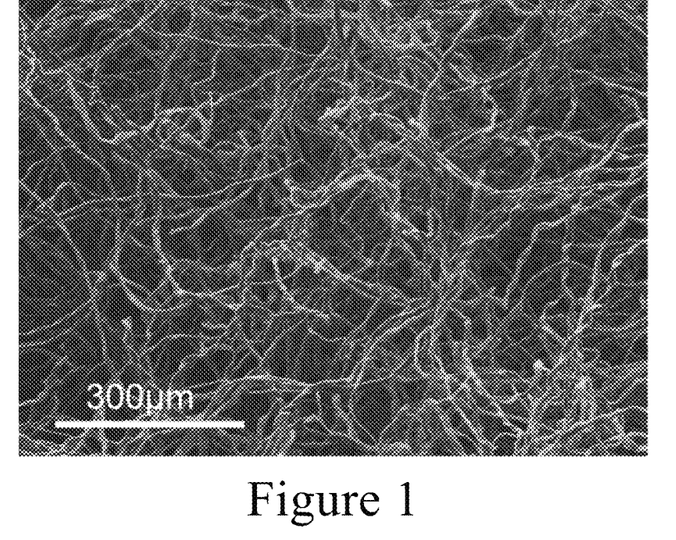
FIG. 1 is a top view scanning electron microscope (SEM) image of the three-dimensional porous hollow carbon fibers obtained in embodiment 1 of the present invention.

From the SEM image of FIG. 1, the three-dimensional porous hollow carbon fibers structure can be clearly seen. It consists of intertwined carbon fibers with the diameter of about 10 μm, and the areal pore volume of 0.02 cm$^3$ cm$^{-2}$ (Mercury intrusion porosimetry).

Figure 2:
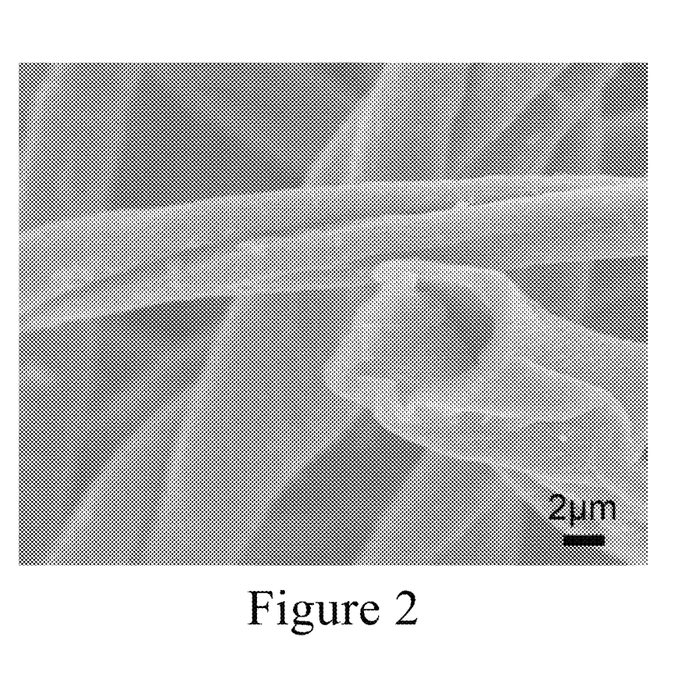
FIG. 2 is a cross-section view SEM image of the three-dimensional porous hollow carbon fibers obtained in embodiment 1 of the present invention.

From the SEM image of FIG. 2, it can be clearly seen that the carbon fiber has hollow structure with the wall thickness of about 1 μm.

(2) Preparation of a Lithium Metal Anode Using a Three-Dimensional Porous Hollow Carbon Fiber as the Current Collector The above-prepared three-dimensional porous hollow carbon fiber was used as the cathode, and the lithium foil was the anode. Lithium was electrochemically deposited on the three-dimensional porous hollow carbon fiber at the areal capacity of 1 mA h cm$^{-2}$, 2 mA h cm$^{-2}$, 3 mA h cm$^{-2}$, 4 mA h cm$^{-2}$, and 6 mA h cm$^{-2}$, respectively.

Figure 3:
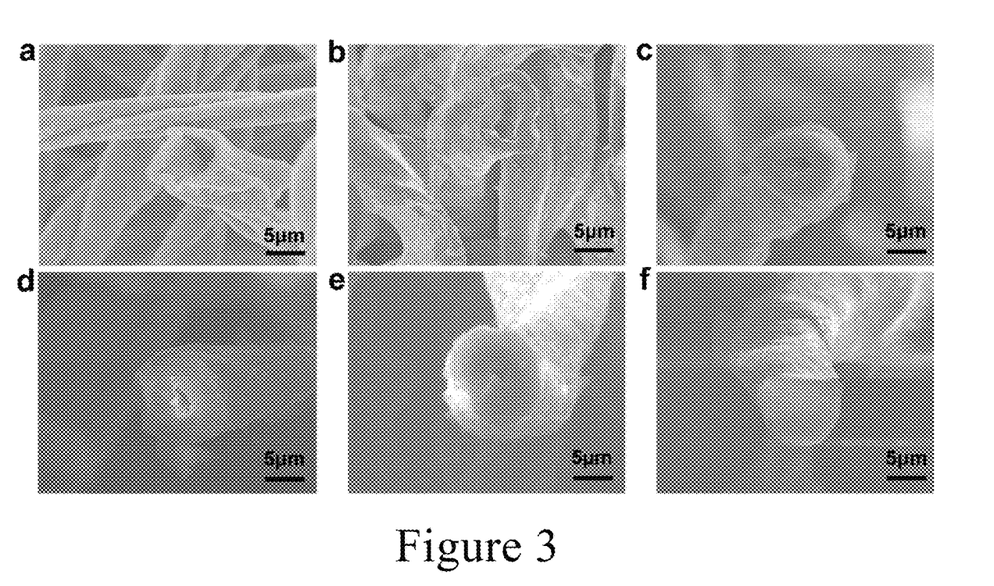
FIG. 3 is cross-sectional view SEM images of (FIG. 3 panel a) the pristine three-dimensional porous hollow carbon fibers and after plating (FIG. 3 panel b) 1 mA h $cm^{-2}$, (FIG. 3 panel c) 2 mA h $cm^{-2}$, (FIG. 3 panel d) 3 mA h $cm^{-2}$, (FIG. 3 panel e) 4 mA h $cm^{-2}$, (FIG. 3 panel f) 6 mA h $cm^{-12}$ of Li into the three-dimensional porous hollow carbon fibers according to embodiment 1 of the present invention.

From the cross-section SEM images of FIG. 3, it can be clearly seen that the wall thickness of the hollow carbon fiber gradually increases as the lithium deposition capacity increases, indicating that a part of lithium metal is deposited on the wall of the hollow carbon fiber current collector. The hollow tube provides space for lithium deposition, which helps inhibit the growth of lithium dendrites and improve the safety, the Coulombic efficiency, and the cycle life of the battery.

Figure 4:
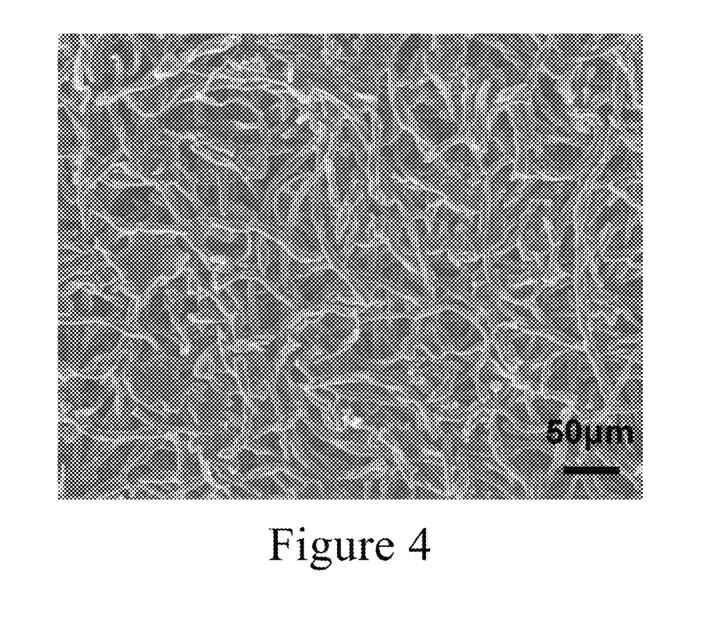
FIG. 4 is a SEM image of the three-dimensional porous hollow carbon fiber current collector with a lithium load amount of 4 mA h $cm^{-2}$ according to embodiment 1 of the present invention.

From the SEM image of FIG. 4, it can be clearly seen that another part of the metallic lithium is deposited along the framework of the three-dimensional hollow carbon fibers and filled in the pores between the carbon fibers without vertical growth of lithium dendrites.

(3) Assembling Lithium Metal Secondary Batteries with the Above Anode

The lithium metal secondary battery was prepared by assembling the metal anode with the three-dimensional porous hollow carbon fibers as the current collector, any suitable cathode and electrolyte.

In the present embodiment, in order to test the safety and cycle life of the anode, half cells were assembled with lithium foil as the counter electrode and the above electrolyte to test the electrochemical performance of the three-dimensional porous hollow carbon fiber current collector.

(4) Electrochemical Measurement of Lithium Metal Secondary Battery

Figure 5:
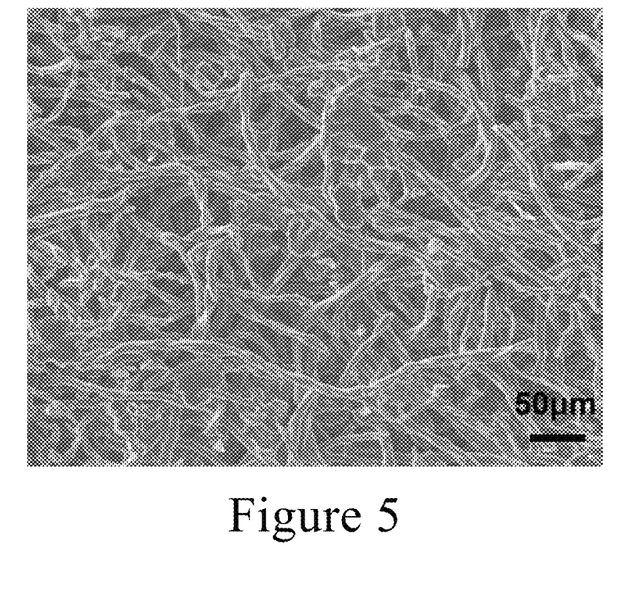
FIG. 5 is a SEM image of the three-dimensional porous hollow carbon fiber current collector with a lithium load amount of 6 mA h $cm^{-2}$ after 20 cycles according to embodiment 1 of the present invention.
Figure 6:
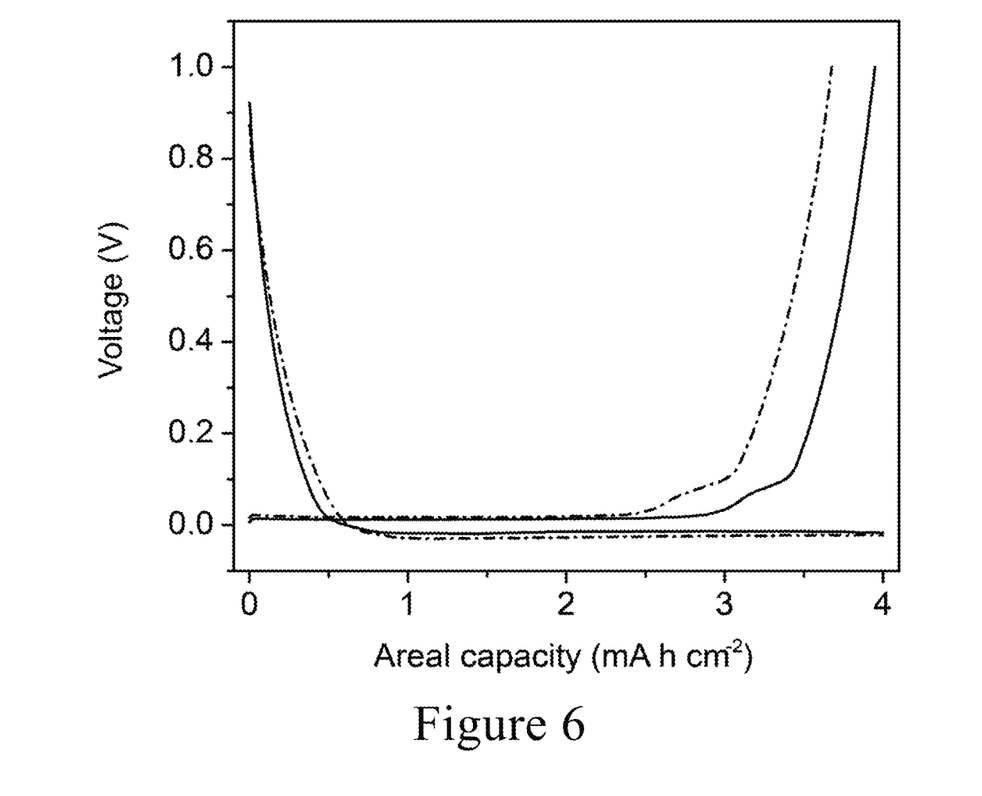
FIG. 6 is a charge-discharge curve of the three-dimensional porous hollow carbon fiber current collector with a lithium load amount of 4 mA h $cm^{-2}$ at the current density of 1 mA $cm^{-2}$ according to embodiment 1 of the present invention.

The charge-discharge apparatus was used for constant current charge-discharge test with the cut-off capacity of 4 mA h cm$^{-2}$ and the test temperature of 25° C. FIG. 5 is a SEM image of the lithium anode after 20 cycles of the cycle test. It can be seen that the lithium surface is very smooth without lithium dendrites. FIG. 6 is the charge-discharge curve of the lithium anode at the current density of 1 mA h cm$^{-2}$. The Coulombic efficiency of lithium plating/stripping reached 92% for the first time and about 99% after 10 cycles. After 100 cycles, the voltage remained stable and the polarization was small. When the three-dimensional porous hollow carbon fiber current collector was loaded with 18 mA h cm$^{-2}$ lithium metal, no lithium dendrites were formed after 10 cycles.

Embodiment 2

The only difference from Embodiment 1 is (1) preparation process of three-dimensional porous hollow carbon fibers. The carbonization temperature used is 800° C. The three-dimensional porous hollow carbon fiber current collector consists of intertwined carbon fibers with the areal pore volume of 0.01 cm$^3$ cm$^{-2}$ and the diameter of about 25 μm. The carbon fiber has hollow structure with the wall thickness of 5 μm.

At the areal capacity of 4 mA h cm$^{-2}$, the Coulombic efficiency of lithium plating/stripping was 80% for the first time and 97% after 10 cycles. When the three-dimensional porous hollow carbon fiber current collector was loaded with 18 mA h cm$^{-2}$ lithium metal, no lithium dendrites were formed after 10 cycles.

Embodiment 3

The only difference from Embodiment 1 is (1) preparation process of three-dimensional porous hollow carbon fibers. The carbonization temperature used is 1000° C. The three-dimensional porous hollow carbon fiber current collector consists of intertwined carbon fibers with the areal pore volume of 0.015 cm$^3$ cm$^{-2}$ and the diameter of about 15 μm. The carbon fiber has hollow structure with the wall thickness of 2 μm.

At the areal capacity of 4 mA h cm$^{-2}$, the Coulombic efficiency of lithium plating/stripping was 87% for the first time and 98% after 10 cycles. When the three-dimensional porous hollow carbon fiber current collector was loaded with 18 mA h cm$^{-2}$ lithium metal, no lithium dendrites were formed after 10 cycles.

Embodiment 4

The only difference from Embodiment 1 is (1) preparation process of three-dimensional porous hollow carbon fibers. The carbonization temperature used is 1400° C. The three-dimensional porous hollow carbon fiber current collector consists of intertwined carbon fibers with the areal pore volume of 0.025 cm$^3$ cm$^{-2}$ and the diameter of about 5 μm. The carbon fiber has hollow structure with the wall thickness of 0.8 μm.

At the areal capacity of 4 mA h cm$^{-2}$, the Coulombic efficiency of lithium plating/stripping was 90% for the first time and 96% after 10 cycles. When the three-dimensional porous hollow carbon fiber current collector was loaded with 18 mA h cm$^{-2}$ lithium metal, no lithium dendrites were formed after 10 cycles.

Embodiment 5

The only difference from Embodiment 1 is (1) preparation process of three-dimensional porous hollow carbon fibers. The processed cotton was first calcined at 700° C. for 1 h and then at 1200° C. for 2 h. The three-dimensional porous hollow carbon fiber current collector consists of intertwined carbon fibers with the areal pore volume of 0.018 cm$^3$ cm$^{-2}$ and the diameter of about 12 μm. The carbon fiber has hollow structure with the wall thickness of 1.2 μm.

At the areal capacity of 4 mA h cm$^{-2}$, the Coulombic efficiency of lithium plating/stripping was 90% for the first time and 98% after 10 cycles. When the three-dimensional porous hollow carbon fiber current collector was loaded with 18 mA h cm$^{-2}$ lithium metal, no lithium dendrites were formed after 10 cycles.

Embodiment 6

The only difference from Embodiment 1 is (1) preparation process of three-dimensional porous hollow carbon fibers. The obtained sample after carbonization was treated by 5M activating reagent KOH. The three-dimensional porous hollow carbon fiber current collector consists of intertwined carbon fibers with the areal pore volume of 0.016 cm$^3$ cm$^{-2}$ and the diameter of about 10 μm. The carbon fiber has hollow structure with the wall thickness of 1 μm.

At the areal capacity of 4 mA h cm$^{-2}$, the Coulombic efficiency of lithium plating/stripping was 90% for the first time and 98% after 10 cycles. When the three-dimensional porous hollow carbon fiber current collector was loaded with 18 mA h cm$^{-2}$ lithium metal, no lithium dendrites were formed after 10 cycles.

Embodiment 7

The only difference from Embodiment 1 is (1) preparation process of three-dimensional porous hollow carbon fibers. The calcination temperature of activation process was 600° C. The three-dimensional porous hollow carbon fiber current collector consists of intertwined carbon fibers with the areal pore volume of 0.012 cm$^3$ cm$^{-2}$ and the diameter of about 8 μm. The carbon fiber has hollow structure with the wall thickness of 0.75 μm.

At the areal capacity of 4 mA h cm$^{-2}$, the Coulombic efficiency of lithium plating/stripping was 85% for the first time and 97.5% after 10 cycles. When the three-dimensional porous hollow carbon fiber current collector was loaded with 18 mA h cm$^{-2}$ lithium metal, no lithium dendrites were formed after 10 cycles.

Embodiment 8

The only difference from Embodiment 1 is that the raw material used is cotton cloth. The three-dimensional porous hollow carbon fiber current collector consists of intertwined carbon fibers with the areal pore volume of 0.008 cm$^3$ cm$^{-2}$ and the diameter of about 20 μm. The carbon fiber has hollow structure with the wall thickness of 3.5 μm.

At the areal capacity of 4 mA h cm$^{-2}$, the Coulombic efficiency of lithium plating/stripping was 79% for the first time and 90% after 10 cycles. When the three-dimensional porous hollow carbon fiber current collector was loaded with 18 mA h cm$^{-2}$ lithium metal, no lithium dendrites were formed after 10 cycles.

Embodiment 9

The only difference from Embodiment 1 is that the raw material used is medical absorbent cotton. The three-dimensional porous hollow carbon fiber current collector consists of intertwined carbon fibers with the areal pore volume of 0.01 cm$^3$ cm$^{-2}$ and the diameter of about 30 μm. The carbon fiber has hollow structure with the wall thickness of 6 μm.

At the areal capacity of 4 mA h cm$^{-2}$, the Coulombic efficiency of lithium plating/stripping was 80% for the first time and 92% after 10 cycles. When the three-dimensional porous hollow carbon fiber current collector was loaded with 18 mA h cm$^{-2}$ lithium metal, no lithium dendrites were formed after 10 cycles.

Embodiment 10

The only difference from Embodiment 1 is that the raw material used is Degreasing cloth. The three-dimensional porous hollow carbon fiber current collector consists of intertwined carbon fibers with the areal pore volume of 0.005 cm$^3$ cm$^{-2}$ and the diameter of about 20 μm. The carbon fiber has hollow structure with the wall thickness of 4 μm.

At the areal capacity of 4 mA h cm$^{-2}$, the Coulombic efficiency of lithium plating/stripping was 78% for the first time and 89% after 10 cycles. When the three-dimensional porous hollow carbon fiber current collector was loaded with 18 mA h cm$^{-2}$ lithium metal, no lithium dendrites were formed after 10 cycles.

Embodiment 11

The only difference from Embodiment 1 is that the raw material used is polyacrylonitrile, using the method of coaxial electrospinning and then calcining. The three-dimensional porous hollow carbon fiber current collector consists of intertwined carbon fibers with the areal pore volume of 0.002 cm$^3$ cm$^{-2}$ and the diameter of about 35 μm. The carbon fiber has hollow structure with the wall thickness of 5.5 μm.

At the areal capacity of 4 mA h cm$^{-2}$, the Coulombic efficiency of lithium plating/stripping was 76% for the first time and 88% after 10 cycles. When the three-dimensional porous hollow carbon fiber current collector was loaded with 18 mA h cm$^{-2}$ lithium metal, plenty of lithium dendrites were formed after 10 cycles.

Embodiment 12

The only difference from Embodiment 1 is that the raw material used is polyvinyl alcohol fiber, using the method of pretreatment with iodine followed by carbonization. The three-dimensional porous hollow carbon fiber current collector consists of intertwined carbon fibers with the areal pore volume of 0.001 cm$^3$ cm$^{-2}$ and the diameter of about 40 μm. The carbon fiber has hollow structure with the wall thickness of 10 μm.

At the areal capacity of 4 mA h cm$^{-2}$, the Coulombic efficiency of lithium plating/stripping was 75% for the first time and 87% after 10 cycles. When the three-dimensional porous hollow carbon fiber current collector was loaded with 18 mA h cm$^{-2}$ lithium metal, plenty of lithium dendrites were formed after 10 cycles.

Embodiment 13

The only difference from Embodiment 1 is that the raw material used is lignin, using the method of coaxial electrospinning and then calcining. The three-dimensional porous hollow carbon fiber current collector consists of intertwined carbon fibers with the areal pore volume of 0.004 cm$^3$ cm$^{-2}$ and the diameter of about 20 μm. The carbon fiber has hollow structure with the wall thickness of 4 μm.

At the areal capacity of 4 mA h cm$^{-2}$, the Coulombic efficiency of lithium plating/stripping was 78% for the first time and 88% after 10 cycles. When the three-dimensional porous hollow carbon fiber current collector was loaded with 18 mA h cm$^{-2}$ lithium metal, plenty of lithium dendrites were formed after 10 cycles.

Embodiment 14

The only difference from Embodiment 1 is that the raw material used is polystyrene, using anodized aluminum as a template. The three-dimensional porous hollow carbon fiber current collector consists of intertwined carbon fibers with the areal pore volume of 0.001 cm³ cm⁻² and the diameter of 300-400 nm. The carbon fiber has hollow structure with the wall thickness of 30 nm.

At the areal capacity of 4 mA h cm⁻², the Coulombic efficiency of lithium plating/stripping was 73% for the first time and 86% after 10 cycles. When the three-dimensional porous hollow carbon fiber current collector was loaded with 18 mA h cm⁻² lithium metal, plenty of lithium dendrites were formed after 10 cycles.

Comparative Sample 1

Figure 7:
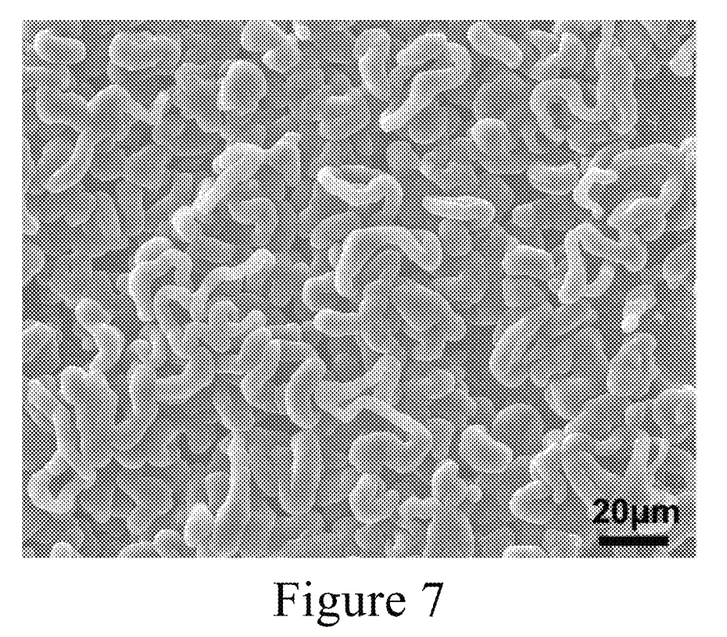
FIG. 7 is a SEM image of the planar copper with a lithium load amount of 4 mA h $cm^{-2}$ according to comparative sample 1 of the present invention.
Figure 8:
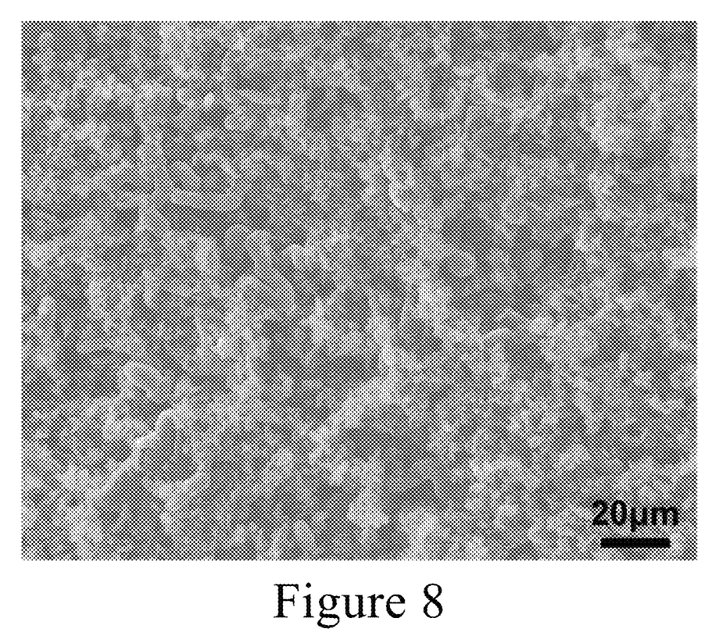
FIG. 8 is a SEM image of the planar copper with a lithium load amount of 4 mA h cm-2 after 10 cycles according to comparative sample 1 of the present invention.
Figure 9:
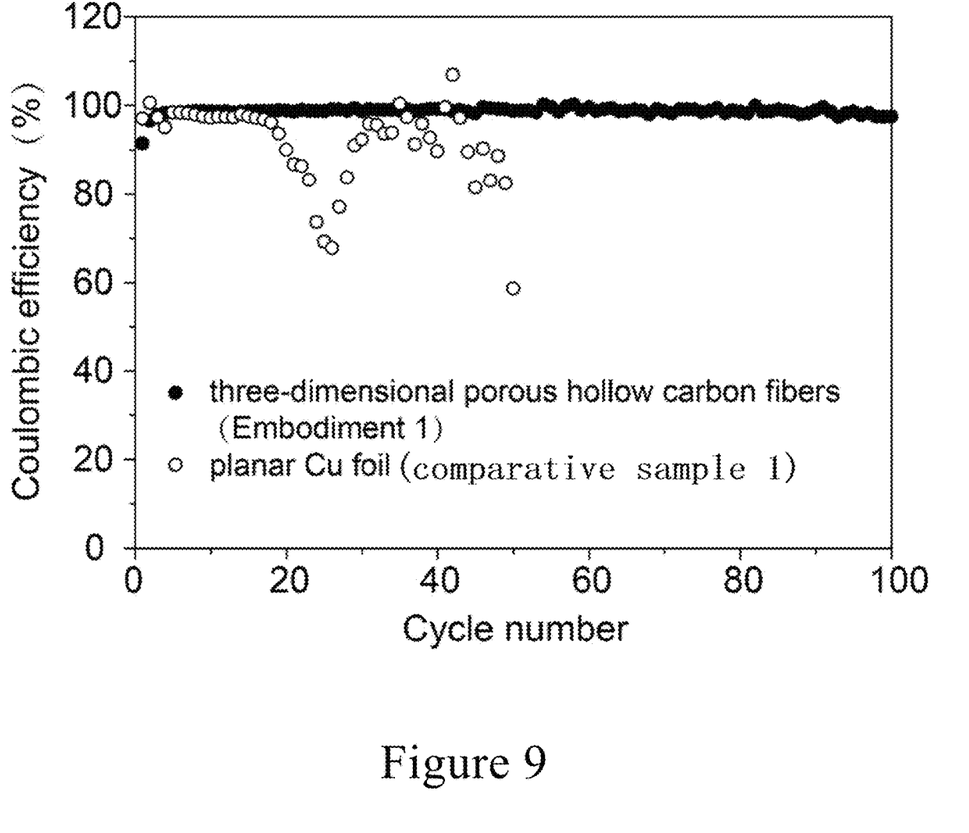
FIG. 9 shows the Coulombic efficiency of lithium plating/stripping on/from the three-dimensional porous hollow carbon fibers according to embodiment 1 and planar copper according to comparative sample 1.

Other conditions are the same as those of Embodiment 1, except that the planar copper foil is used as the current collector. The SEM image in FIG. 7 shows that filamentous lithium dendrites covered the surface of copper foil with the lithium load areal capacity of 4 mA h cm⁻² lithium. After 10 cycles, it can be seen from the SEM image in FIG. 8 that part of the lithium dendrites grew in the vertical direction, which might eventually lead to an internal short circuit. In addition, plenty of inactive "dead lithium" was formed after only 10 cycles, which might lead to the decay of the Coulombic efficiency and shortening of the cycle life. FIG. 9 proves this very well. After a dozen cycles, Coulomb efficiency of the anode in comparative sample 1 was greatly attenuated, followed by large fluctuations. The voltage of lithium plating/stripping became unstable. The occurrence of side reaction caused the Coulombic efficiency to abnormally exceed 100%.

Comparative Sample 2

Other conditions are the same as those of Embodiment 1, except that the first embodiment of the prior art CN201110234427.4 is adopted as the current collector. Part of the lithium dendrites grew in the vertical direction with the lithium load areal capacity of 4 mA h cm⁻² after 10 cycles, which might eventually lead to an internal short circuit. In addition, plenty of inactive "dead lithium" was formed, which might lead to the decay of the Coulombic efficiency and shortening of the cycle life.

Comparative Sample 3

Other conditions are the same as those of Embodiment 1, except that commercially available solid carbon fiber is adopted as the current collector. Part of the lithium dendrites grew in the vertical direction with the lithium load areal capacity of 4 mA h cm⁻² after 10 cycles, which might eventually lead to an internal short circuit. In addition, plenty of inactive "dead lithium" was formed, which might lead to the decay of the Coulombic efficiency and shortening of the cycle life.

In summary, when the three-dimensional porous hollow carbon fiber current collector of the present invention is used in the metal anode, the formation of lithium dendrites can be effectively suppressed, thereby improving the safety, Coulombic efficiency and cycle life of the metal anode.

The invention claimed is:

1. A method for preparing a three-dimensional porous current collector comprising a plurality of hollow carbon fibers, each hollow carbon fiber having a hollow center of a diameter of 3 to 20 μm for loading a metal anode and suppressing lithium dendrites growth, and a wall thickness of 1 to 3 μm, and the three-dimensional porous current collector has having an areal pore volume of 0.01 to 0.03 cm³/cm², the method comprises the following steps:

preparing a raw material made from cotton by washing, drying, rolling, and slicing;

carbonizing the raw material by calcination in a protective atmosphere at 800 to 1200° C. for 30 minutes to 5 hours to obtain a carbonized material;

activating the carbonized material in a protective atmosphere by first soaking in a series of activating agents selected from KOH and NaOH with a concentrations of 0.5 M-5 M;

and then drying and calcining in the protective atmosphere at 400 to 900° C. at a heating rate of 1 to 10° C/min for 20 min to 6 h to obtain an activated material;

washing the activated material, first with diluted hydrochloric acid or dilute sulfuric acid, then with deionized water and ethanol, and drying to obtain the plurality of hollow carbon fibers.

2. The method according to claim 1, wherein the raw material is one or more selected from cotton cloth, and medical absorbent cotton, and the protective atmosphere is inert gas selected from argon, helium, nitrogen, and mixtures thereof.

* * * * *